Nov. 13, 1934.    W. A. DEL MAR    1,980,387
ELECTRIC CABLE
Filed Jan. 14, 1932
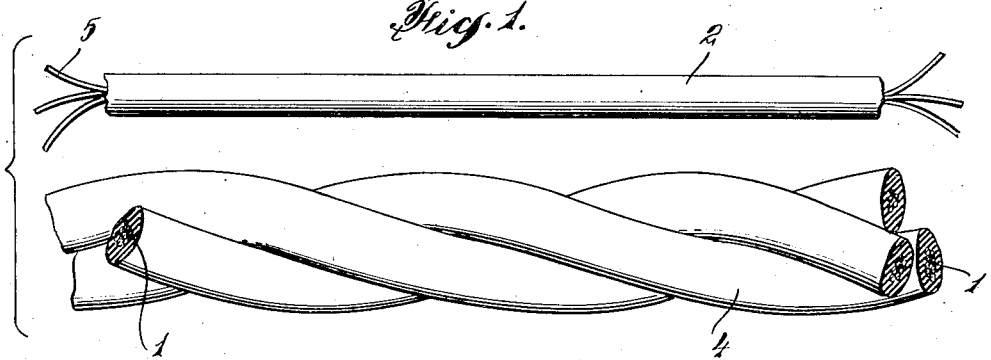
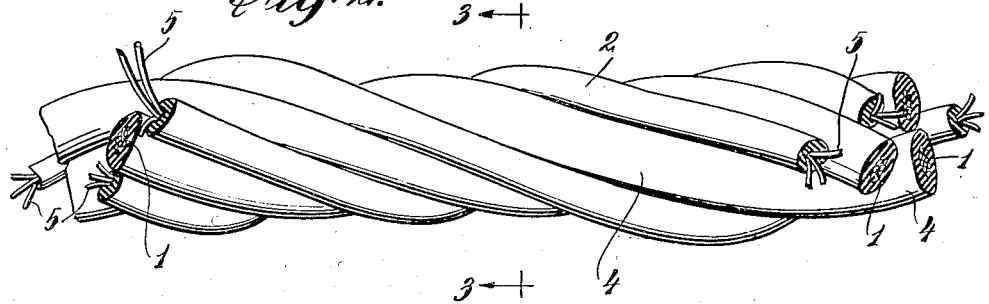
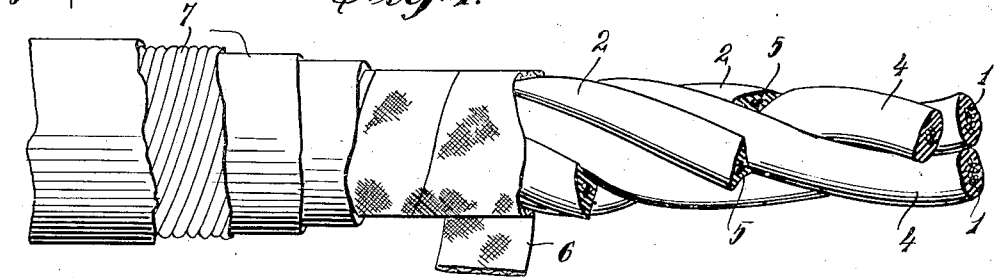
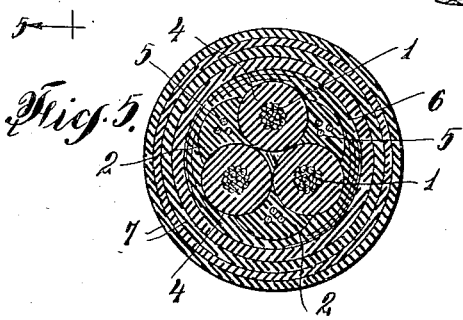
INVENTOR
Wm. A. Del Mar.
BY
ATTORNEY Patented Nov. 13, 1934

1,980,387

UNITED STATES PATENT OFFICE 1,980,387

ELECTRIC CABLE

William A. Del Mar, Greenwich, Conn., assignor to Habirshaw Cable and Wire Corporation, New York, N. Y., a corporation of New York Application January 14, 1932, Serial No. 586,569

5 Claims. (Cl. 173—264)

Multiple-conductor cables comprising two or more insulated conductors have been made by assembling the individual conductors into a group, either laid parallel or twisted together, the interstices between the conductors being filled with jute, wrinkled paper or other fibrous material. Where such cables have been used in the presence of moisture some difficulty has been experienced due to the water absorptive qualities of the fibrous fillers. Furthermore, air contained in fibrous fillers ionizes, in high voltage cables, causing the generation of ozone, which attacks the rubber. Attempts have been made, so far as I know, to overcome the above difficulties by use of soft asphaltic compound which is applied between the insulated conductors in a fluid condition and which depends on its surface tension and viscosity for its ability to remain in the interstices of the cable. Some difficulty has been experienced with cables of this type when operated at high temperature, due to the softening and flow of the asphaltic fillers, and at low temperatures, due to their brittleness.

The object of my invention is to overcome the difficulties and disadvantages above named in electric cables and to provide fillers or laterals for the interstices that will be permanent.

In carrying out my invention I provide fillers or laterals for multiple-conductor cables comprising factice, i. e., vulcanized vegetable oils, which may be mixed with suitable amount of rubber, and inert fillers, if desired, the mixture to be preferably extruded, in cylindrical form, upon a fibrous cord or string. This covering of the cord or string by my improved compound may be accomplished in much the same way that a rubber insulation compound is extruded upon a traveling copper wire in making rubber insulated wire. The inert filler for the compound may be such as zinc oxide or talc. Suitable proportions for my improved fillers or laterals may comprise 75 parts of factice, 15 parts of rubber and 10 parts of inert filler, mixed on a rubber mill or mixer in the well-known way for rubber compounds. When the compound described is extruded upon the fibrous cord or string the compound will preferably be in circular form and will adhere to the cord or string which serves as a core for the compound giving the tensile strength requisite for handling. The compound described is pliable and adapted to be deformed under pressure.

In making the cable, my improved fillers or laterals are laid up with the conductors of the multiple-conductor cable at the time of cabling, with the fillers or laterals in the insterstices outside of the conductors, and a fabric binder tape is applied around the conductors and fillers, under tension, so as to press the factice compound from its original circular cross-section into approximately triangular cross-section or form required to fill the interstices of the cable. The fillers or laterals described may either be in an unvulcanized condition, or may be subsequently vulcanized as desired. In the latter case, there must be sulphur added to the compound in the proportions known to the art.

In the accompanying drawing—

Fig. 1 indicates parts for a multiple-conductor cable embodying my invention.

Fig. 2 indicates said parts assembled.

Fig. 3 is a cross-section on line 3, 3 of Fig. 2.

Fig. 4 illustrates my improved cable, and

Fig. 5 is a cross-section on line 5, 5 in Fig. 4.

The insulated conductors are indicated at 1 and at 2 are my improved fillers or laterals located in the interstices between the conductors and bearing against their insulation 4. The fibrous cord or string within the fillers is indicated at 5. The tape wound tightly around the fillers and the conductors is indicated at 6, having the effect previously described, of pressing the inner surfaces of the fillers into substantially triangular relation against the insulation of the conductors, for filling the interstices therebetween. Any suitable or usual covering or coverings, such as at 7, may be provided around the binder tape 6 according to the character of cable desired.

Having now described my invention what I claim is:—

1. An electric cable comprising a plurality of insulated conductors and fillers in the interstices between the conductors, said fillers comprising a plastic compound the major portion of which comprises factice, and a binder around the compound and the conductors, the binder being under tension against the fillers, the fillers being forced by the binder into the interstices between the conductors and against the insulation of the latter to fill the interstices.

2. An electric cable comprising a plurality of insulated conductors and plastic fillers in the interstices between the conductors, the fillers comprising a major portion of factice, a less portion of rubber, and a minor portion of inert material, and a binder enclosing the fillers and the conductors the binder being under tension against the fillers, the fillers being forced by the binder into the interstices between the conductors and against the insulation of the latter to fill the interstices.

3. An electric cable comprising a plurality of insulated conductors and fillers in the interstices between the conductors, said fillers comprising fibrous cords and a compound, the major portion of which comprises factice, around the cords, and a binder surrounding the conductors and the fillers under tension.

4. An electric cable comprising a plurality of insulated conductors and fillers in the interstices between the conductors, said fillers comprising a pliable compound containing factice and a fibrous core, and a binder tape under tension around the fillers retaining the latter against the insulation of the conductors.

5. An electric cable comprising a plurality of insulated conductors, fillers in the interstices between the conductors, said fillers comprising vulcanized vegetable oil and rubber in a plastic condition, a binder under tension around the fillers forcing the latter into said interstices and against the insulation, and a covering around the fillers and conductors.

WILLIAM A. DEL MAR.